Figure 1:
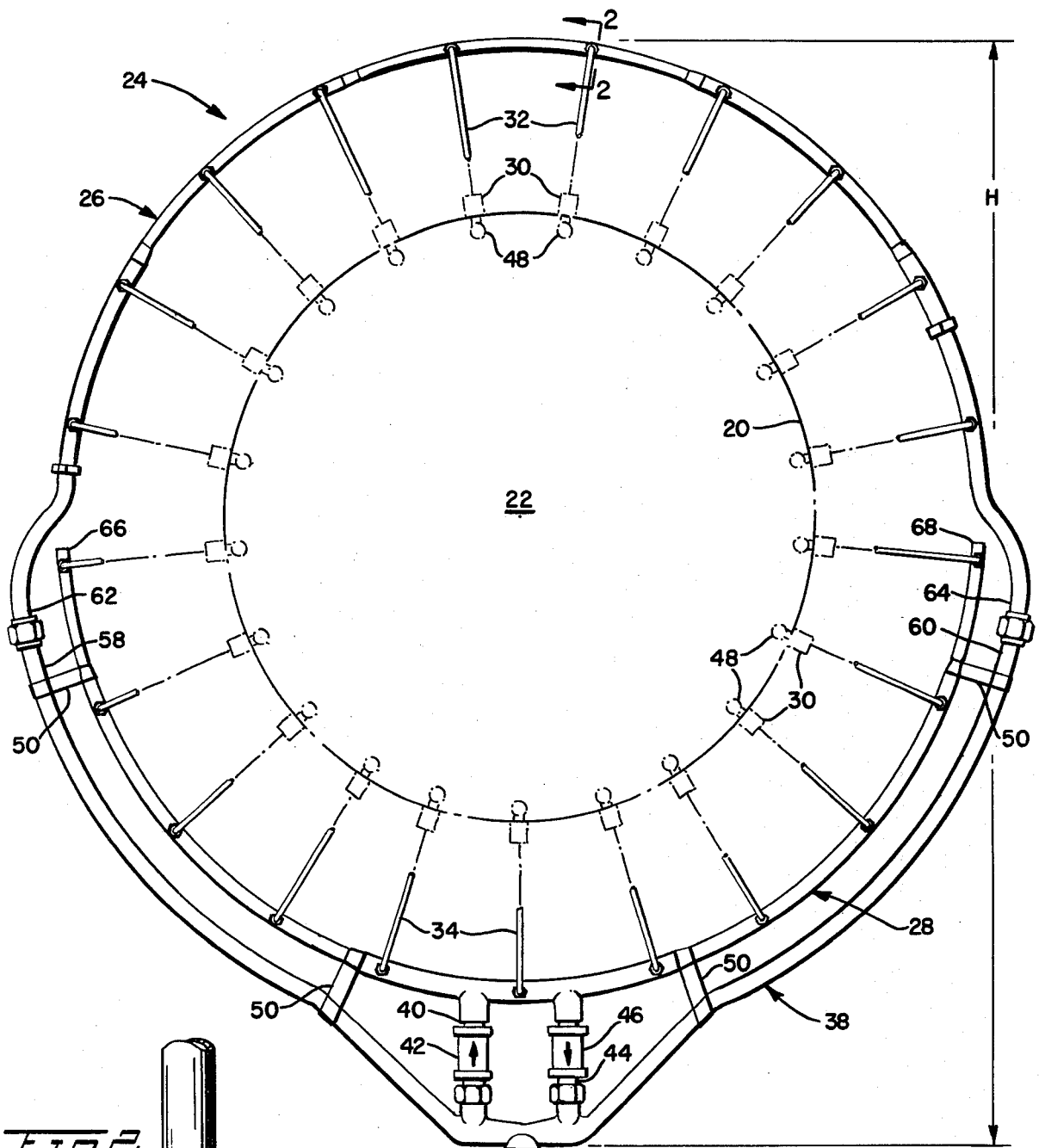

United States Patent [19]

Faulkner et al.

[11] 4,402,184

[45] Sep. 6, 1983

[54] GAS TURBINE ENGINES

[75] Inventors: Robie L. Faulkner; Graham E. Ogborne, both of San Diego, Calif.

[73] Assignee: International Harvester Company, Chicago, Ill.

[21] Appl. No.: 214,321

[22] Filed: Dec. 8, 1980

[51] Int. Cl.³ .......................... F23R 3/28; F02C 7/228
[52] U.S. Cl. ................................................. 60/739
[58] Field of Search .................. 60/739, 261; 431/8, 431/174, 177; 137/207.5, 154

[56] References Cited

U.S. PATENT DOCUMENTS

| | | |
|---|---|---|
| 2,606,066 | 8/1952 | Thompson . |
| 2,676,461 | 4/1954 | Gove .................................... 60/739 |
| 2,846,845 | 8/1958 | Parker .................................. 60/739 |
| 2,870,826 | 1/1959 | Thorpe et al. . |
| 2,881,827 | 4/1959 | Roche et al. . |
| 3,774,851 | 11/1973 | Simmons ............................. 60/739 |
| 4,062,183 | 12/1977 | Davies et al. ........................ 60/739 |

FOREIGN PATENT DOCUMENTS 577062 5/1946 United Kingdom .
2041085 9/1980 United Kingdom .

Primary Examiner—Robert E. Garrett
Attorney, Agent, or Firm—LeBlanc, Nolan, Shur & Nies

[57] ABSTRACT

A split type fuel manifold for gas turbine engines which includes a simple check valve rather than the heretofore used individual valves or complex central valve for uniformly distributing fuel to an array of liquid fuel injectors supplied by the manifold.

10 Claims, 2 Drawing Figures

GAS TURBINE ENGINES

The present invention relates to gas turbine engines and, more specifically, to novel, improved systems for supplying fuel to the combustors of such engines.

In one typical type of engine with which our invention is concerned, air is compressed—typically by a multi-stage, axial flow compressor—and discharged through a diffuser into an annular combustor where the air is heated by fuel burned in the combustor. The heated air and the combustion products generated in the combustor are expanded first through a gas producer turbine, which drives the compressor, and then through a power turbine. The power turbine can be coupled to a generator, gas pipeline booster compressor, mechanical drive, or other driven unit.

One exemplary gas turbine engine of the character just described—manufactured by Solar Turbines International of San Diego, Calif., designed for industrial purposes, and rated at 10,000 horsepower—is disclosed in U.S. Pat. No. 4,167,097 issued Sept. 11, 1979, to Wosika et al and other patents and pending applications.

The foregoing, and other, gas turbine engines with which our invention can be used to advantage are intended to at least optionally be operated on liquid fuels; and it is operation on that type of fuel with which we are concerned.

In particular, in the type of engine with which we are concerned, the fuel is distributed from a circular or ring-shaped manifold to a similarly configured array of fuel injectors spaced equidistantly around the outer case of the engine's annular combustor at the upstream end of the latter. Air, typically taken from the compressor discharge, is also supplied to the injectors. This air atomizes the liquid fuel before latter is introduced into the combustion chamber so that it will burn efficiently.

Efficient combustion is important for economic reasons and because it minimizes the generation of noxious combustion products. This objective requires that the fuel be uniformly distributed to all of the fuel injectors associated with a combustor. That can be a difficult problem to solve, particularly during light-off, because the fuel manifold must be filled and because conditions are otherwise highly transient and do not favor this goal.

Heretofore, the problem of uniformly distributing fuel to the several fuel injectors of an annular gas turbine engine combustor has been solved by employing a complex central fuel distribution valve or by associating a fuel metering valve with each injector as shown in U.S. Pat. Nos. 2,606,066 issued Aug. 5, 1952, to Thompson and 3,774,851 issued Nov. 27, 1973, to Simmons. Both of these schemes have the drawback of being extremely expensive.

We have now discovered that this is avoidable. The high cost of the prior art liquid fuel distribution systems can be avoided by a novel distribution system which employs a split ring manifold and a simple inexpensive check valve which, in conjunction with the split manifold, insures sufficiently uniform flow to the injectors served by the manifold to be acceptable. The cost of this system is only a small fraction of those heretofore employed and described above.

From the foregoing it will be apparent to the reader that one important and primary object of our invention resides in the provision of novel, improved liquid fuel supply systems for gas turbine engines.

Another important and also primary object of the invention is the provision of such systems which are capable of distributing fuel in a generally equal fashion to the several fuel injectors in an annular array thereof but are substantially less expensive to manufacture than the systems heretofore employed for that purpose.

A related and also important object of the invention resides in the use of a split manifold in conjunction with a check valve to accomplish the goals identified above.

Figure 2:
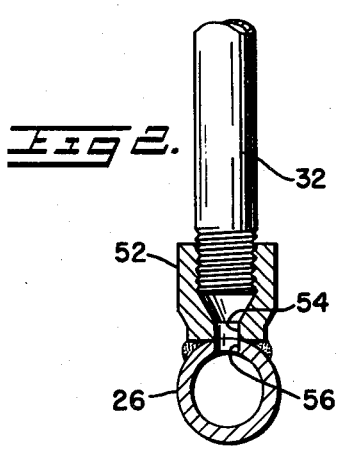

Other important objects and features and additional advantages of our invention will become apparent from the appended claims and as the ensuing detailed description and discussion proceeds in conjunction with the accompanying drawing in which:

FIG. 1 shows, schematically, the combustor of a gas turbine engine and, in more detail, a system in accord with the principles of our invention for supplying liquid fuel to the combustor; and FIG. 2 is a fragmentary section through certain components of the fuel supply system, taken substantially along line 2—2 of FIG. 1.

Referring now to the drawing, the phantom line identified by reference character 20 in FIG. 1 represents, schematically, the outer casing of a gas turbine engine combustor 22 such as that disclosed in the above-identified U.S. Pat. No. 4,167,097.

Liquid fuel is supplied to combustor 22 in atomized form by a liquid fuel supply system 24 embodying, and constructed in accord with, the principles of the present invention.

The illustrated, exemplary, fuel supply system is intended to be employed in a vertical orientation. Its main components include an upper manifold 26, a lower manifold 28, and a circular array of fuel injectors 30 supplied with fuel from upper manifold 26 through fuel lines 32 and from lower manifold 28 through fuel lines 34. Fuel is supplied to the upper manifold 26 through fuel lines 36 and 38 and to the lower manifold 28 through a fuel line 40 extending between that manifold and fuel supply line 38. A check valve 42 is incorporated in fuel line 40 for purposes that will become apparent hereinafter.

Finally, fuel supply system 24 also includes a fuel return line 44 between lower manifold 28 and fuel line 38 in which a second check valve 46 is incorporated.

The schematically illustrated fuel injectors 30 are of the air blast type. Fuel supplied to the injectors is atomized by air discharged from the compressor (not shown) of the gas turbine engine with which they are employed, and the fuel is then discharged into combustor 22.

During light-off or start-up, the rate-of-flow of the liquid fuel to the injectors is low; the pressure drop across the fuel injectors is therefore correspondingly low; and the hydraulic head in the fuel supply system consequently keeps the fuel from reaching the upper fuel injectors in the array thereof until long after it has reached the injectors at lower elevations in that array.

As discussed above, the effect of this uneven distribution of fuel during light-off conditions is inefficient combustion and a substantial increase in the generation of noxious emissions.

Fuel supply system 24 ensures that the fuel is more equally distributed to the upper and lower injectors, thereby promoting combustion efficiency and minimizing the generation of noxious emissions.

As shown in FIG. 1, combustor casing 20 has a circular section; and the fuel injectors 30 are spaced around this casing in a circular array at essentially equal intervals with the discharge ports 48 of the injectors located inside casing 20 to discharge atomized fuel into combustor 22.

The upper and lower manifolds 26 and 28 together make up what we term a split manifold. Both are of semi-circular configuration; and, together, they concentrically encircle casing 20 of combustor 22. The two manifolds are fastened together in this relationship by brackets 50 which are not of critical construction as far as our invention is concerned.

The fuel lines 32 and 34 through which the liquid fuel flows from the upper and lower manifolds to injectors 30 extend radially inward from the manifolds to the injectors at essentially equal intervals therearound. At their outer ends, they are connected to the manifolds by tubular fittings 52 best shown in FIG. 2. Apertures 54 in the fittings and 56 in the manifolds with which they are associated provide communication between the latter and fuel lines 32 and 34.

The line 38 through which fuel is supplied to upper manifold 26 is, like the latter, of generally arcuate configuration. It is spaced concentrically from, and surrounds, lower manifold 28; and its upper ends 58 and 60 are connected, on opposite sides of the fuel supply system, to the lower ends 62 and 64 of upper manifold 26.

The line 36 by which fuel line 38 is supplied communicates with the latter at the bottom thereof and mid way between its upper ends 58 and 60.

It will be appreciated from FIG. 1 and the preceding description of our invention that, particularly under the low fuel pressure conditions existing at light-off, the hydraulic head H across the fuel supply system would result in the fuel reaching those injectors toward the bottom of combustor 22 much more rapidly than the uppermost injectors if a simple ring type manifold were employed to supply fuel to the injectors. This inequality of flow distribution is significantly reduced in the illustrated fuel supply system 24 by the flow equalizing arrangement composed of fuel line 40 and check valve 42.

Specifically, fuel line 40 is connected between line 38 and lower manifold 28 approximately mid way between the two ends 66 and 68 of the lower manifold, the liquid fuel thereby flowing from line 3 through line 40 into, and in opposite directions through, the lower manifold.

Check valve 42, which is oriented to allow fuel to flow in the direction just described, is set to open when the pressure in fuel line 38 reaches one-half of the hydraulic head H across the system. That reduces the fuel pressure at the bottom of lower manifold 28; and, consequently, the pressure vertically across that manifold (check valve outlet pressure—H/2) more nearly equals the pressure across the upper manifold 26 and its fuel supply line 38 (line pressure in 38—H) than would otherwise be the case.

Therefore, the rates-of-flow of the fuel through the two manifolds and the time required to fill them are more equal. Thus, with a simple, inexpensive check valve arrangement, we accomplish essentially the same result as do the more expensive central, and injector valve-associated, fuel distribution systems disclosed in the above-cited Thompson and Simmons patents.

Also, by thus reducing the effect of the hydraulic head across fuel supply system 24, the arrangement just described results in a more uniform flow of fuel to the injectors at different elevations during the operation of the engine with which the fuel supply system is associated. This, too, results in more efficient combustion and lower emission levels.

The final feature of fuel supply system 24 alluded to above—fuel return line 44—is provided so that fuel can drain from lower manifold 28 back into fuel lines 38 and 36 when the engine with which the fuel supply system is associated is shut down. The check valve 46 in line 44 is oriented for fuel flow in that direction. As long as the engine is running and fuel is being supplied to it through fuel lines 36 and 38, the pressure in line 38 is higher than that in lower manifold 28 by virtue of the pressure drop across check valve 42; and valve 46 accordingly remains closed. When the engine is shut down, however, the pressure in lines 36 and 38 drops; and the hydraulic head on the fuel in the lower manifold consequently causes the check valve to open and allow the fuel to drain out of the manifold through return line 44.

The invention may be embodied in other specific forms without departing from the sirit or essential characteristics thereof. The present embodiments are therfore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by United States Letters Patent is:

1. A gas turbine engine fuel supply system comprising: upper and lower, arcuately shaped fuel manifolds having, together, an essentially circular configuration; a circular array of equiangularly spaced fuel injectors spaced concentrically within the circle formed by said manifolds; fuel lines connecting those fuel injectors girdled by each of the manifolds to that manifold at generally equidistantly spaced locations therealong; means for supplying fuel to the upper manifold at the opposite ends thereof; a fuel supply line connected between said fuel supplying means and said lower manifold approximately mid way between the ends of the latter; and means in said fuel supply line for creating a pressure drop that is effective to cause said fuel to be distributed at rates approaching equal through the upper and lower fuel manifolds.

2. A gas turbine engine fuel supply system as defined in claim 1 wherein the means for creating said pressure drop is a check valve oriented to allow fuel to flow from said fuel supplying means through said fuel supply line to said lower manifold.

3. A gas turbine engine fuel supply system as defined in either of the preceding claims 1 or 2 which includes means for draining fuel from said lower manifold coincidentally with the shutdown of the engine with which the fuel supply system is associated, said means comprising a fuel return line connected between said fuel supplying means and said lower manifold adjacent said fuel supply line and a check valve in said fuel return line which is oriented to allow fuel to flow from said lower manifold into said fuel supplying means when the pressure in the latter falls below the pressure in the lower manifold.

4. A gas turbine engine fuel supply system as defined in either of the preceding claims 1 or 2 wherein said fuel supplying means comprises a first, generally semicircular fuel line means surrounding the lower manifold and connected at its opposite ends to the ends of the upper manifold and a second fuel line communicating with the first fuel line approximately mid way between the ends of the latter.

5. A gas turbine engine fuel supply system as defined in either of the preceding claims 1 or 2 wherein said fuel injectors are of the air blast type.

6. A gas turbine engine comprising a combustor, a circular array of equiangularly spaced fuel injectors for introducing a liquid fuel into the combustor in atomized form, and means for effecting a flow of fuel to, and through, said injectors, said last-mentioned means comprising: upper and lower, arcuately shaped fuel manifolds having, together, an essentially circular configuration; fuel lines connecting those fuel injectors girdled by each of the manifolds to that manifold at generally equidistantly spaced locations therealong; means for supplying fuel to the upper manifold at the opposite ends thereof; a fuel supply line connected between said fuel supplying means and said lower manifold approximately mid way between the ends of the latter; and means in said fuel supply line for creating a pressure drop that is effective to cause said fuel to be distributed at rates approaching equal through the upper and lower fuel manifolds.

7. A gas turbine engine as defined in claim 6 wherein the means for creating said pressure drop is a check valve oriented to allow fuel to flow from said fuel supplying means through said fuel supply line to said lower manifold.

8. A gas turbine engine as defined in either of the preceding claims 6 or 7 which includes means for draining fuel from said lower manifold coincidentally with the shutdown of the engine with which the fuel supply system is associated, said means comprising a fuel return line connected between said fuel supplying means and said lower manifold adjacent said fuel supply line and a check valve in said fuel return line which is oriented to allow fuel to flow from said lower manifold into said fuel supplying means when the pressure in the latter falls below the pressure in the lower manifold.

9. A gas turbine engine fuel supply system as defined in either of the preceding claims 6 or 7 wherein said fuel supplying means comprises a first, generally semicircular fuel line means surrounding the lower manifold and connected at its opposite ends to the ends of the upper manifold and a second fuel line communicating with the first fuel line approximately mid way between the ends of the latter.

10. A gas turbine engine fuel supply system as defined in either of the preceding claims 6 or 7 wherein said fuel injectors are of the air blast type.

* * * * *

UNITED STATES PATENT AND TRADEMARK OFFICE
CERTIFICATE OF CORRECTION

PATENT NO. : 4,402,184
DATED : September 6, 1983
INVENTOR(S) : ROBIE L. FAULKNER; GRAHAM E. OGBORNE It is certified that error appears in the above—identified patent and that said Letters Patent is hereby corrected as shown below:

On the Title Page please change the name of the Assignee from "International Harvester Company, Chicago, Ill." to read as follows:

-- Solar Turbines Incorporated, San Diego, Calif.--

Signed and Sealed this

Tenth Day of April 1984

[SEAL]

Attest:

GERALD J. MOSSINGHOFF

Attesting Officer

Commissioner of Patents and Trademarks